United States Patent [19]

Kops

[11] 4,002,055
[45] Jan. 11, 1977

[54] PROCESS AND APPARATUS FOR TESTING THE TIGHTNESS OF SEAM JOINTS OF SYNTHETIC RESIN SHEETS BY MEANS OF VACUUM

[75] Inventor: Friedrich Kops, Rondorf, Germany

[73] Assignee: Dynamit Nobel Aktiengesellschaft, Germany

[22] Filed: Feb. 20, 1973

[21] Appl. No.: 334,074

[30] Foreign Application Priority Data

Feb. 18, 1972 Germany ............... 2207648

[52] U.S. Cl. .................................. 73/40; 73/46; 252/408
[51] Int. Cl.² .................................. G01M 3/12
[58] Field of Search ....................... 73/40, 46

[56] References Cited

UNITED STATES PATENTS

| 2,108,176 | 2/1938 | Newby | 73/46 |
| 2,567,926 | 9/1951 | Dunkelberger | 73/40 X |
| 2,660,053 | 11/1953 | Buehner | 73/40 |
| 2,679,747 | 6/1954 | Andrus | 73/40 |
| 2,845,394 | 7/1958 | Thompson | 73/40 UX |
| 3,388,587 | 6/1968 | Hara et al. | 73/40 |
| 3,524,342 | 8/1970 | Hobbs | 73/40 |

FOREIGN PATENTS OR APPLICATIONS

| 215,694 | 10/1941 | Switzerland | 73/40 |
| 223,418 | 11/1968 | U.S.S.R. | 73/40 |

Primary Examiner—Richard C. Queisser
Assistant Examiner—Joseph W. Roskos
Attorney, Agent, or Firm—Craig & Antonelli

[57] ABSTRACT

An apparatus for testing the strength and/or the leak-proofness of seams or joints formed between synthetic resin sheets comprising a semicylindrical shell of transparent material having rounded closed-in portions and forming with its peripheral edges, sealing strip means surrounding said opening a continuous frame for engaging said strip means and a flexible closure means operatively associated with said frame for sealing off the opening whereby a test chamber is formed and pump means connected to said chamber for applying a vacuum thereto.

9 Claims, 4 Drawing Figures

U.S. Patent     Jan. 11, 1977     Sheet 1 of 2     4,002,055
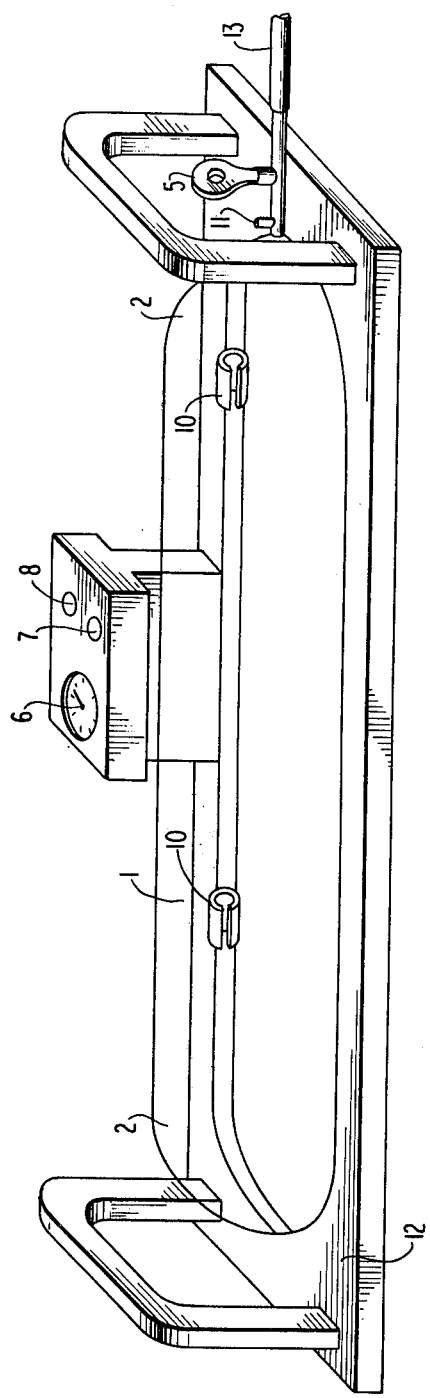
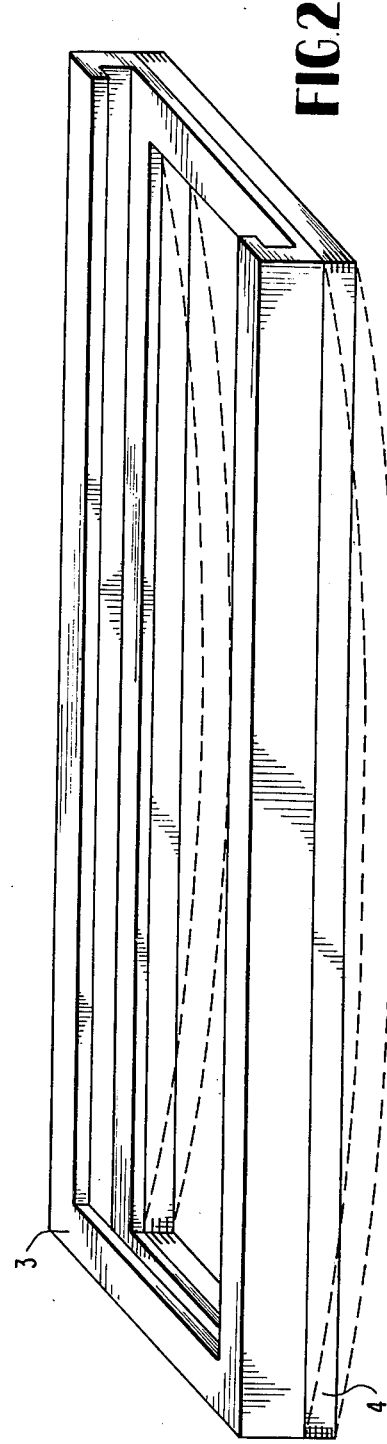

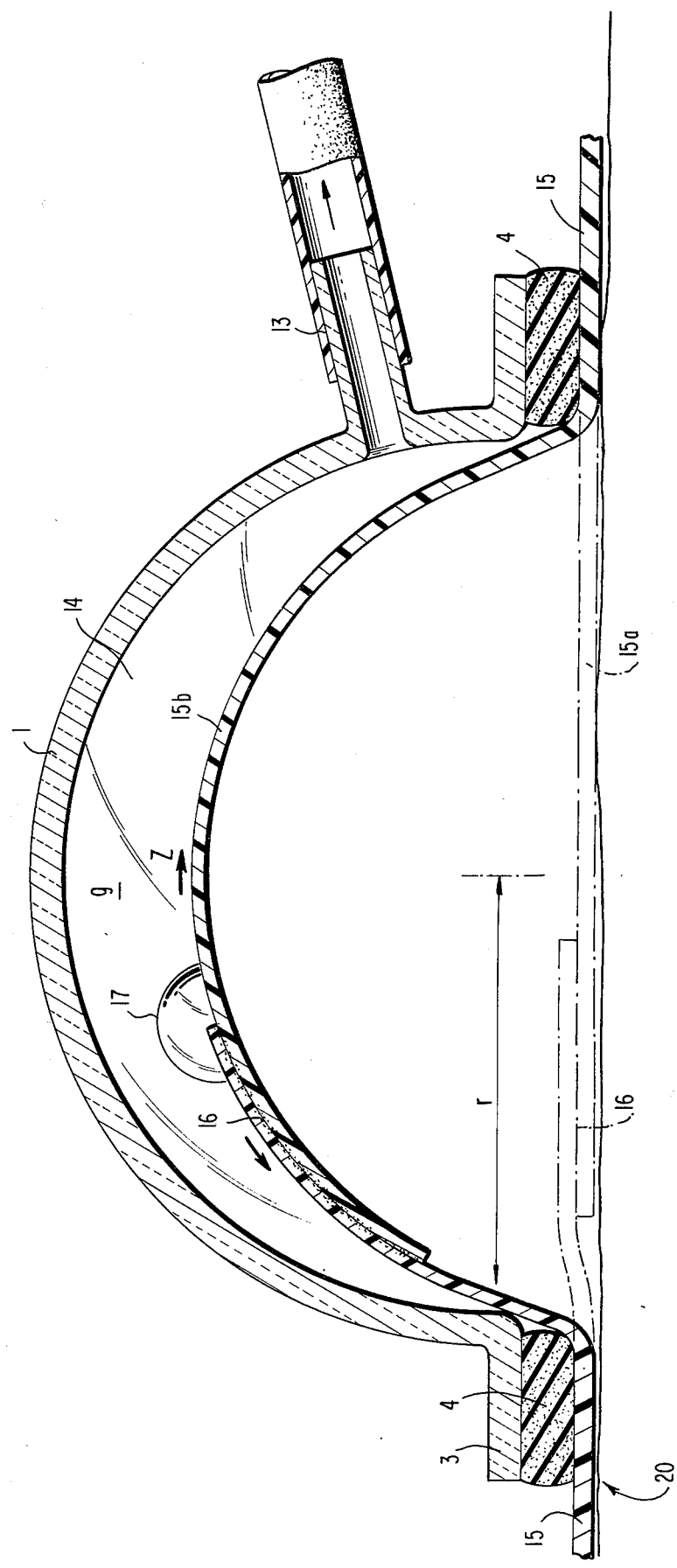

PROCESS AND APPARATUS FOR TESTING THE TIGHTNESS OF SEAM JOINTS OF SYNTHETIC RESIN SHEETS BY MEANS OF VACUUM

This invention relates to an apparatus for testing the water- and/or air-tightness of linings and seals made of synthetic resin films, synthetic resin sealing sheets, or the like.

In the lining of containers, trash depositories, and/or in the sealing of water tanks, tunnels, etc., as well as in the production of so-called surface seals of embankments for reservoirs, pumped storage tanks, or the like, with, for example, synthetic resin sealing sheets, an absolute tightness of the seam joints between the individual sheets is an important requirement. This tightness is required because the material forming the seal generally consists only of one layer of the synthetic resin. In particular, it is also desirable for economical reasons to avoid multiple-layer sealing materials, or to reduce the use of such materials to a minimum.

The sealing sheets are generally tested by the manufacturer with respect to flaws and freedom of voids by means of various methods. The joining of the individual sealing sheets into larger units is accomplished, in part, in the workshop or also at the building site and is subject to various uncertain factors. The lining and/or seal is composed of individual synthetic resin sheets or panels. The individual sections are joined together by welding, either by the thermal method, e.g. by high-frequency welding, heated V-blade welding, hot-air welding, or hot-gas welding, or by the cold method, the so-called solution welding technique with the use of a solvent. The seam joint can be a butt joint or a lap joint. However, in all cases, faulty seam joints caused by technical or human errors cannot be excluded.

The problem thus posed is to indicate such flaws in seam joints made of synthetic resin films and/or sheets.

It is conventional to subject elastic synthetic resin sheets joined by a lap to a direct control by probing the seam with the fingers. This test method is dependent on the reliability of the person executing the test and, due to fatigue, it is uncertain and not reliable to the desired extent. In case to butt-welded rigid panels of a synthetic resin, this method cannot be employed.

It is a furthermore conventional to test seals between lap-welded synthetic resin sheets by means of a high-tension device. In this method, metallic strips or wires are incorporated, inserted, or attached at a certain distance from the edge of the sealing sheet. A high-voltage induction current, which must be chosen in dependence on the breakdown voltage of the thickness of the material to be tested, yields an indication of flaws in the welding seam due to the capacitive charging or also grounding of the test leads, by sparkover. This method is dependent on various factors and fails if one of the following prerequisites is missing:

a. a constant line voltage for generating the high tension;
b. a minimum distance to the test strip or wire, i.e. no inclined capillaries;
c. a dry surface on the sealing sheet, otherwise drainage of the voltage occurs due to the larger capacitance of the surface;
d. a sufficient darkness to be able to observe the thus-produced spark and/or color change;
e. an accurate maintenance of the required distance to the test strip or wire; and
f. an intact test strip or wire.

In case of butt-welded panels, this method cannot be utilized.

Furthermore, the welding of synthetic resin sheets is known by the use of an automatic heated V-blade welding unit. In this method an intermediate channel is produced which is to be tested with water or compressed air. This method is applicable only in case of joints produced in a workshop and on an absolutely planar surface. The method cannot be used on building sites, and it is likewise unusable for so-called T-joints and for butt-welded panels.

Finally, it is known to test butt-welded steel sheets for tightness in the boiler or container construction by means of vacuum. In this method, the weld seams are covered with a colorless, foam-evolving liquid, soap solution, or the like, and closed off at the location to be tested by a metallic frame having a bottom seal of foam rubber or the like and a glass pane inserted flush and airtight at the top. The air disposed in this cavity is evacuated by means of a pump or the like. Wherever there are flaws in the joint, (soap) bubbles are formed, which are designated as "control bubbles" hereinbelow, and which thus indicate places where leakage occurs.

This method can be employed in the testing of rigid synthetic resin panels which are butt-welded, but cannot be used in case of elastic synthetic resin sheets welded by the lap-welding technique. Thus, when the air is evacuated from the space surrounded by the sheet, the plastic sheet with the seam joint to be tested bulges upwardly into the space to be evacuated and prevents an accurate observation of any "control bubbles" which occur. By an external pressure of 1 atmosphere absolute ambient underneath the sealing sheet, the overlapped edges of the plastic sheets are pressed, in the form of a lip seal, against the observation surfaces and thus against each other. The influx of the outside air, required for the production of the soap bubbles, is therefore impaired or prevented.

This invention has as one of its objects to make it possible to test seam joints, even of elastic synthetic resin sheets, by the evacuation of air from a leakproof testing apparatus.

According to this invention, a testing apparatus is provided for testing the tightness of seam joints of synthetic resin sheets by a vacuum produced by a pump in a testing chamber. This apparatus is characterized in that a semi-cylindrical shell is provided, with preferably rounded corners or ends in the form of quarter spheres of a transparent material, e.g. acrylic glass, and optionally with an internal, transparent reinforcement. Also, the shell is equipped, on its open underside, with a sufficiently wide, continuous frame of, for example PVC, and a seal of, for example, closed-cell foam material such as foam rubber or the like.

In the devices proposed according to this invention, several characteristics or peculiarities of the elastic materials to be tested of which the sealing sheets, are preferably made, are taken into account, so that a faultless testing of the seam tightness is made possible. The peculiarities are:

1. The surface of the seal or seam to be tested, which is covered, bulges inwardly, depending on the thickness and elongation capacity of the resinous material employed.

2. In case of large flaws or openings in the weld seam, a large cross section of the flaws forms which increases with decreasing internal pressure. The air enters this flaw with a vigorous flow and can prevent a clear formation of bubbles.

3. Small flaws become apparent in case of an elastic material only at a certain higher subatmospheric pressure--before such value is reached, the flaws remain closed.

4. An accurate observation is to be possible also in case of poor lighting, for example at a building site in a tunnel.

The apparatus of this invention, as well as the process performed thereby will be further understood from the following detailed description and with reference to the accompanying drawing wherein:

FIG. 1 is a perspective view of the testing apparatus of the invention with a semi-cylindrical shell as the vacuum chamber;

FIG. 2 is a view of a sealing frame;

FIG. 3 is a lighting means, and

FIG. 4 is a cross-section of the testing apparatus as used on the plastic seam to be tested.

As shown in FIG. 1, the semi-cylindrical shell 1 made of a transparent synthetic resin, e.g. acrylic glass, and manufactured, for example, by the deep-drawing method, in a sufficient thickness has rounded corners 2 in the shape of quarter spheres. This shell is equipped with a sufficiently wide, continuous strip 12 of, for example, PVC, for receiving a sealing frame 3 and a gasket or seal 4 made of a closed-cell foam material, for example, foam rubber. The frame and seal are shown in FIG. 2. By means of a vacuum pump, a maximum theoretical evacuation of up to about 760 mm. Hg column is possible (this meets the above-noted requirement No. 3).

Furthermore, the semic-circular shape of the shell of the testing apparatus does not offer an upwardly bulging, elastic sealing sheet any abutment or support and the vacuum employed is selected in correspondence with the thickness and/or the ruptural strength of the test sheet, so that the sheet cannot come into contact with the observation surface of the shell even under a high vacuum.

It is advantageous to employ pumps which rapidly evacuate the space or chamber formed when the shell 1 is fitted into the frame 3 (by sliding strip 12 into groove 12), so that the testing time is kept at a minimum. For the detection of coarse and/or large flaws in a welded seam produced by lap-welding, the valve 5 of a correspondingly larger cross section is provided in the testing apparatus, i.e. in the suction line 13, which valve can be operated manually. This valve, in spite of a strong suction power of the pump, which is schematically shown, permits a weak vacuum in the testing apparatus, whereby due to the low air velocity obtained, the production of the desired "control bubbles" at large flaws is ensured. (This meets requirement No. 2).

In case of vague results, it is furthermore possible to vary the testing vacuum by means of the valve 5, without having to adjust the pump.

Furthermore, the testing apparatus comprises the vacuum manometer 6 which indicates the respective vacuum and, upon a standstill of the indication, below the minimum testing vacuum determined by the control lamp 7, informs of a larger flaw.

In order to make it possible to observe the thus-produced control bubbles also in case of poor illumination, a separate lighting means is arranged in the tesing apparatus, in the form of a cold light fluorescent tube 9, mounted in the clamping contacts 10, which lighting means can be switched on and off from the outside of the chamber. (this meets requirement 4); see FIG. 3.

When the manual valve 5 is closed, the vacuum builds up very rapidly. Only starting with a certain minimum pressure, any control bubbles are observed in case of micropores. Therefore, the testing apparatus is provided with the additional control lamp 8 which responds, via a vacuum switch, not illustrated, only at a minimum subatmospheric pressure.

A 100% evacuation of the air is not possible economically, since the procedure would take too long. Besides, the testing apparatus would otherwise be stressed to the yield point. Therefore, the evauation, for safety reasons, is to be conducted, for example, up to about 90% capacity, i.e. about 700 mm. Hg column. The safety valve 11 with a build-in whistle sound indicates when the given maximum vacuum is obtained.

The testing procedure is terminated, after the whistle has sounded, by actuating the manual valve 5 and is again initiated after a lateral displacement of the apparatus by the length of the testing apparatus.

In order to be able to test the seams of the lining material also in throats, i.e., zones where the sealing seam does not extend straight and planar, the testing apparatus is provided with an exchangeable sealing frame with a corresponding configuration for the corners. Internal and external corners are tested by means of a spherically shaped testing apparatus on the same basis.

For the testing of the leaky portions of a seal, a foam-producing liquid is advantageously employed. Such substances are conventional and are based on a soap solution or the like in a colorless and thinly fluid condition for the testing of welding seams in steel tanks.

This testing liquid cannot be utilized with reliable results when testing smooth and, for example, light-colored plastic sheets. After application, the liquid runs off the smooth surfaces which bulge upwardly during testing and also those surfaces attached to vertical walls, and leaves too thin a film, so that a control bubble is produced only once and for a minimum amount of time; thus, such a bubble can perhaps escape observation, especially when such single bubbles occur at several places simultaneously. In order to avoid this uncertainty, the testing liquid, in accordance with a further aspect of this invention, is made to be thixotropic and can also optionally be dark-colored, e.g., by a dye or like colorant. As a consequence, a thicker film adheres to inclined and/or vertical areas of the surface to be tested and produces either larger or several control bubbles which remain for a longer period of time. Upon the bursting of these bubbles, which is unavoidable, they leave, at the bases of the bubbles, markedly darker, circular lines grouped around the leaky location. Thus, a permanent marking of flaws is likewise made possible.

Additionally, there is the further advantage that, due to the thus-provided discoloring of the surroundings of the seam joint to be tested, a simple optical control is produced of the fact that a testing step was effected at all.

In FIG. 4, plastic sheets 15 with junction seam 16 are shown with the testing apparatus placed on the plastic test sheets. The testing apparatus with the transparent shell 1 held in the sealing frame 3 is so placed on the plastic sheets to be tested that the junction seam 16 of the two sheets 15 (in position 15a) is disposed within the testing chamber formed within shell 1. A tight seal between the plastic sheets and the testing apparatus is obtained by the gasket 4 arranged continuously beneath the frame 3. After the testing apparatus has been placed tightly on the test area of the sheets supported, for example, by a tank wall or the like wherein the sheets 15 serve as a lining, or on a work bench or like at the test site, (this support is generally designated by reference numeral 20) the chamber formed by the shell 1 is evacuated via line 13. Due to the thus produced vacuum, the elastic synthetic plastic sheet is expanded and curved upwardly; as indicated at portion 15b. By this upward bulging of the plastic sheets, a tensile stress Z is produced which simultaneously tests the strength of the seam 16. Also since the seam is covered with a soapy testing liquid, control bubbles 17 are produced by the vacuum in case of a leak at the seam, thereby making it possible to detect leaky points in the seams. It will be understood that strength of stress Z is obtained from the product of the radius $r$ and the testing pressure $g$ (which may be on the order of $-0.5$ atm. gauge).

While the novel embodiments of the invention have been described, it will be understood that various omissions, modifications and changes in these principles may be made by one skilled in the art without departing from the spirit and scope of the invention.

What is claimed is:

1. An apparatus for testing the leakproofness of seam joints of synthetic resin sheets by a vacuum produced by a pump means in a testing chamber, which comprises a semi-cylindrical shell of a transparent material having rounded corners in the form of quarter spheres, said shell forming an opening at its underside, sealing strip means surrounding said opening, a continuous frame for engaging said strip means and a flexible closure means secured to said frame fro sealing off the opening by contacting the synthetic resin sheets whereby a test chamber is formed with said apparatus over a portion of the seam joint to be tested.

2. An apparatus according to claim 1, characterized in that the frame is exchangeable and is sealed with respect to the sheets to be tested.

3. An apparatus according to claim 1, characterized in that a control valve is provided for the regulation and expansion of the internal pressure in the semi-cylindrical shell produced by connection to a vacuum pump means.

4. An apparatus according to claim 3, characterized in that a control lamp is provided which, via vacuum switch, indicates, by lighting up, when a certain vacuum has been reached in the semi-cylindrical shell.

5. An apparatus according to claim 3, characterized in that a safety means is provided in the form of a valve which indicates when the desired maximum vacuum has been reached within said chamber, and simultaneously allows outside air to enter.

6. An apparatus according to claim 1, characterized in that a vacuum manometer is provided which indicates the respectively ambient vacuum and/or informs of a larger flaw upon a standstill of the indication.

7. An apparatus according to claim 1, characterized in that the dimensions and shape of a semi-circular shell are such that the shell does not offer upwarding bulging elastic sheets forming the seam joint any abutment during application of a high vacuum to said test chamber whereby possible leakage points in the seam joint can be formed and then observed.

8. A process for testing the tightness of a seam joint of elastic synthetic resin sheets which comprises applying a thixotropically adjusted and dark-colored liquid or paste to the seam joint of the resin sheets to be tested, placing the joint seam of resin sheets to be tested under and in sealed contact with a semi-cylindrical shell forming a test chamber above said seam joint, applying a vacuum to said test chamber to cause said seam joint and said resin sheets to bulge upwardly in said test chamber, producing control bubbles at leaky locations in said seam joint and providing clearly visible markings on the resin sheets around the leaky locations upon bursting of the bubbles of said liquid or paste whereby said leaky locations can be determined.

9. The process according to claim 8, characterized in that the control bubbles are produced at the leaky locations in said seam joint by causing said seam joint and adjacent portions of the resin sheets to expand and curve upwardly to form a bulged-out portion that does not contact said semi-cylindrical shell.

* * * * *